United States Patent
Querejeta Andueza et al.

(10) Patent No.: US 11,320,150 B2
(45) Date of Patent: May 3, 2022

(54) GAS COOKING APPLIANCE

(71) Applicant: Copreci, S.Coop., Aretxabaleta (ES)

(72) Inventors: Félix Querejeta Andueza, Hendaye (FR); Aitor Zabalo Bayon, Arrasate-Mondragon (ES)

(73) Assignee: COPRECI, S.COOP, Aretxabaleta (ES)

( * ) Notice: Subject to any disclaimer, the term of this patent is extended or adjusted under 35 U.S.C. 154(b) by 291 days.

(21) Appl. No.: 16/703,587

(22) Filed: Dec. 4, 2019

(65) Prior Publication Data

US 2020/0333013 A1 Oct. 22, 2020

(30) Foreign Application Priority Data

Apr. 17, 2019 (EP) .................................. 19382303

(51) Int. Cl.
*F24C 3/12* (2006.01)
*F16K 31/02* (2006.01)
*F23N 1/00* (2006.01)

(52) U.S. Cl.
CPC ................ *F24C 3/12* (2013.01); *F16K 31/02* (2013.01); *F23N 1/005* (2013.01)

(58) Field of Classification Search
CPC .. F24C 3/12; F24C 3/122; F24C 3/126; F23N 1/00; F23N 1/002; F23N 1/022; F23N 1/025; F23N 1/005; F23N 5/00; F23N 5/12; F23N 2231/06; F23N 2237/02; F16K 31/004; F16K 31/02
(Continued)

(56) References Cited

U.S. PATENT DOCUMENTS 2,304,200 A * 12/1942 Plein ....................... F23N 5/123
 431/47
3,002,550 A * 10/1961 Schreter ................... F23N 5/12
 431/16
(Continued)

FOREIGN PATENT DOCUMENTS

DE 19752323 C1 * 4/1999 ............. F23N 1/005
GB 2292630 A * 2/1996 ............. F23N 5/203
(Continued)

OTHER PUBLICATIONS

Machine Translation of Ohara et al (Year: 1994).*
Machine Translation of Vegter (DE 19752323 C1) (Year: 1999).*
Machine Translation of Wang (JP 2017190939 A) (Year: 2017).*

*Primary Examiner* — David J Laux
(74) *Attorney, Agent, or Firm* — Edell, Shapiro & Finnan, LLC

(57) ABSTRACT

A cooking appliance is disclosed that according to one embodiment includes a plurality of gas burners, an electrode associated with each burner for igniting the flame, a flame sensor associated with each burner for monitoring the flame and at least one electric switch associated with an actuator that is transitional between open and closed positions. The cooking appliance also includes a control unit electrically connected to the electrodes, the flame sensors, and the switch. When the switch assumes the closed position, the control unit is activated and then in turn powers the electrodes and the flame sensors. Thereafter, the control unit sequentially monitors the presence or absence of flame in the burners during repeated time cycles.

19 Claims, 7 Drawing Sheets

(58) Field of Classification Search
USPC .................................................... 431/24, 50
See application file for complete search history.

(56) References Cited

U.S. PATENT DOCUMENTS

| | | | | | |
|---|---|---|---|---|---|
| 3,111,160 | A | * | 11/1963 | Mellette | ............... F23N 5/022 431/16 |
| 4,035,134 | A | * | 7/1977 | Matthews | ............ F23N 5/203 431/21 |
| 5,018,964 | A | * | 5/1991 | Shah | ............... F23N 5/203 431/45 |
| 5,575,638 | A | * | 11/1996 | Witham | ............... F24C 3/126 431/73 |
| 5,816,791 | A | * | 10/1998 | Home | ............... F23N 5/102 431/46 |
| 5,875,773 | A | * | 3/1999 | Jansen | ............... F24C 3/126 126/42 |
| 8,936,018 | B2 | * | 1/2015 | Aleardi | ............... F23N 5/242 126/39 BA |
| 9,480,358 | B2 | * | 11/2016 | Albizuri Landazabal | ............... A47J 37/0786 |
| 9,841,191 | B2 | * | 12/2017 | Johncock | ............ A47J 37/0786 |
| 2003/0087213 | A1 | * | 5/2003 | Reifel | ............... F23N 5/203 431/11 |
| 2005/0019716 | A1 | * | 1/2005 | Fernandez | ............ F24C 3/126 431/24 |
| 2010/0043773 | A1 | * | 2/2010 | Aleardi | ............... F23N 5/123 126/39 BA |
| 2010/0304315 | A1 | * | 12/2010 | Gulkanat | ............... F23N 5/107 431/6 |
| 2016/0348916 | A1 | * | 12/2016 | French | ............... F23N 5/242 126/39 BA |
| 2019/0338956 | A1 | * | 11/2019 | Huang | ............... F23N 5/203 431/21 |
| 2020/0256561 | A1 | * | 8/2020 | Mery | ............... F24C 3/126 431/24 |

FOREIGN PATENT DOCUMENTS

| | | | | |
|---|---|---|---|---|
| GB | 2292630 | A | | 2/1996 |
| JP | H0674443 | A | * | 3/1994 ............... F23N 5/10 |
| JP | 2017190939 | A | * | 10/2017 ............ G08C 17/02 |

* cited by examiner

GAS COOKING APPLIANCE

CROSS-REFERENCE TO RELATED APPLICATIONS

The present application relates to and claims the benefit and priority to European Application No. EP19382303.6, filed Apr. 17, 2019.

FIELD

The present invention relates to gas cooking appliances and to methods for controlling the presence or absence of flame of a plurality of gas burners implemented with the gas cooking appliances.

BACKGROUND

Gas cooking appliances comprising a gas conduit feeding a plurality of gas burners with gas, and a gas valve for regulating the gas flow reaching each gas burner, are known. The flame in the gas burner is usually ignited normally, in particular in gas barbecues, by acting on an ignition electrode by means of a push-button, once the passage of gas to the burner has been opened, which can be manual. In other embodiments of gas cooking appliances, the appliances comprise a control unit electrically connected to ignition electrodes associated with the gas burners, the gas cooking appliances also comprising flame sensors associated with each gas burner, which monitor the presence or absence of flame in the burners, during, and subsequently after the flame is ignited. This monitoring of the flame is carried out in a combined manner with the burners, and needs a significant amount of energy to be able to carry it out.

US Patent Publication No. 2016/0348916A1 discloses a gas cooking appliance comprising a plurality of gas burners, an electrode associated with each burner to ignite the flame in the burner when it is activated, a flame sensor associated with each burner for monitoring the presence or absence of the flame when it is activated, the flame sensor being configured to provide a detection signal based on the presence or absence of the flame, a gas valve for regulating the gas flow reaching each burner from a gas conduit, an electric switch associated with each actuator and configured to be activated when the actuator is activated, and a control unit electrically powered at a voltage V, and electrically connected to the electrodes, the flame sensors and the switches, which is activated when at least one of the switches is activated, the control unit activating the electrodes and the flame sensors of the burners, the control unit determining the presence or absence of flame produced in the gas burners, based on the reception of the detection signals sent by the flame sensors. The gas valves comprise a safety electromagnetic unit, and are electrically connected to the control unit, needing a continuous electrical supply for their operation.

SUMMARY

One aspect relates to a gas cooking appliance comprising a plurality of gas burners, an electrode associated with each burner for igniting the flame in the burner when it is activated, a flame sensor associated with each burner for monitoring the presence or absence of the flame when it is activated, the flame sensor being configured to provide a detection signal based on the presence or absence of the flame, a gas valve for regulating the gas flow reaching each burner from a gas conduit, at least one electric switch associated with an actuator and configured to be activated when the actuator is actuated, and a control unit electrically powered at a voltage V, and electrically connected to the electrodes, the flame sensors and the switch, which is activated when the switch is activated, the control unit activating the electrodes and the flame sensors of the burners, the control unit determining the presence or absence of flame produced in the gas burners, based on the reception of the detection signals sent by the flame sensors.

The control unit is configured to sequentially monitor in time cycles T the presence or absence of flame in the burners.

Another aspect relates to a method for controlling the presence or absence of flame of a plurality of burners implemented with a gas cooking appliance like the one defined above.

In US Patent Publication No. 2016/0348916A1 the gas cooking appliance, which is a barbecue, comprises gas valves with an electromagnetic unit needing the pressing of the actuator to allow the passage of gas from a gas conduit towards the gas burners, and a continuous electric power supply which allows keeping the electromagnetic unit open, and therefore the passage of gas in the gas valve open. The gas cooking appliance comprises as an electric power source an electrical transformer (powered from the electrical grid) with a power of at least 60 w necessary to power the electromagnetic unit of the gas valves, to activate the electrodes, and to activate the flame sensors, either continuously or intermittently, of the burners the switches of which have been activated. Alternatively or additionally, the gas cooking appliance has as an electric power source a battery, or the transformer can be powering the battery. The electric power supply of the gas cooking appliance by means of a battery, having such a considerable electric consumption derived from the operation of the gas valves and of the probability of coincidence of the combined monitoring of several gas burners, even though it is intermittent, must only allow the operation of the gas cooking appliance in an isolated manner and in short time periods, since it forces having the gas valves electrically powered in the entire cooking process.

In the gas cooking appliance and the method of the invention, the gas cooking appliance comprises a control unit which is electrically connected to the electrodes and the flame sensors of all the gas burners. But the control unit is not electrically connected to the gas valves. As a result, the gas cooking appliance of the invention needs much less electrical energy for its operation due to the gas valves not being electrically powered. The monitoring of the presence or absence of flame in the burners by the flame sensors needs a considerable amount of electrical energy if it is carried out in a combined manner between the gas burners the respective associated switches of which have been activated, either continuously or, if it is carried out intermittently, coinciding in the burners the switches of which have been activated. To reduce this need for electrical energy supply, the gas cooking appliance and the method implemented in the gas cooking appliance of the invention, carry out the monitoring of the presence or absence of the flame in the burners in a sequential manner in time cycles T. Thus, only one burner is monitored from the control unit each time, only its associated flame sensor being activated for a time. When the defined time cycle T, which can be that defined by the standard of gas appliances, elapses, all the burners will have been monitored and the monitoring will start again from the first burner.

As a result of such low energy consumption, the supply voltage of the battery required, as an electric power source of the gas cooking appliance, is low, being able to be simple commercial use batteries. Thus, long cooking work periods are obtained with the gas cooking appliance, of more than 300 hours, with a required electric power of less than 0.001 w. Thus, a gas cooking appliance and a method implemented with the gas cooking appliance are obtained which are simple, of a lower cost, due to comprising a smaller number of parts, and the parts being of a lower cost, such as the gas valves, and of lower electric consumption, whereby the total cost is lower.

These and other advantages and features will become evident in view of the figures and the detailed description.

DETAILED DESCRIPTION OF THE INVENTION

Figure 1:
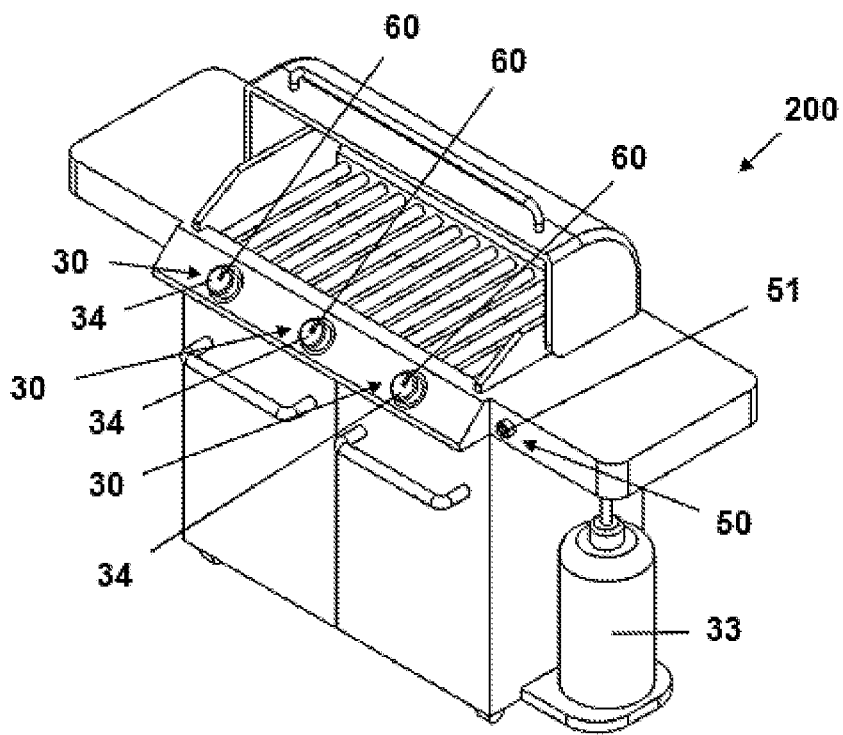
FIG. 1 shows a schematic of a gas cooking appliance according to one embodiment, which in this case corresponds to a gas barbecue.
Figure 2:
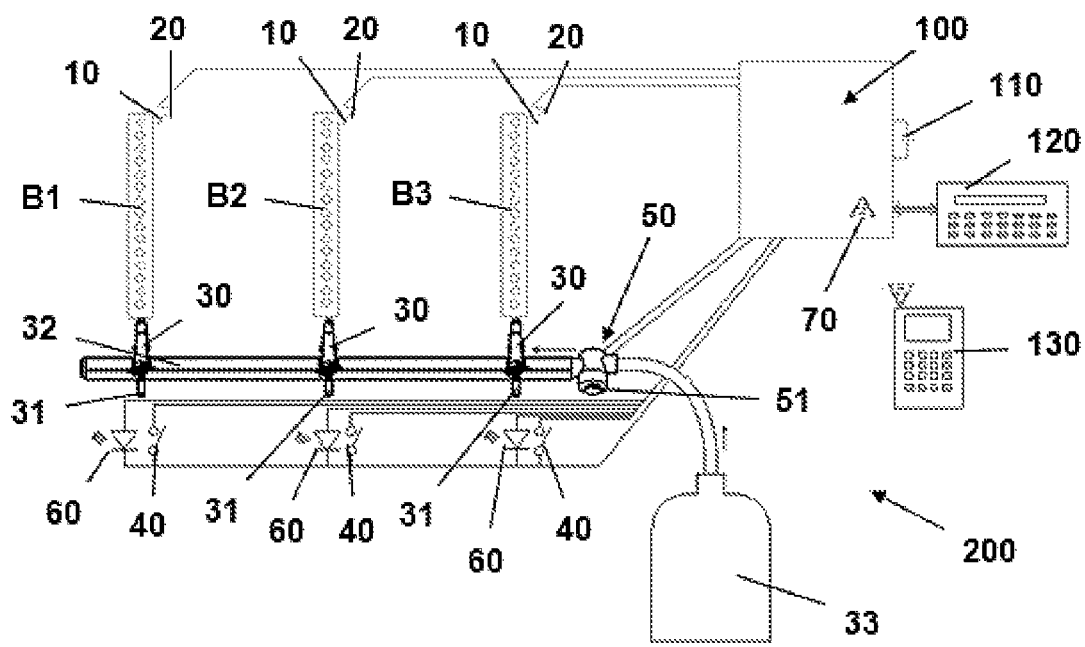
FIG. 2 shows a partial schematic view of the gas cooking appliance of FIG. 1.
Figure 3:
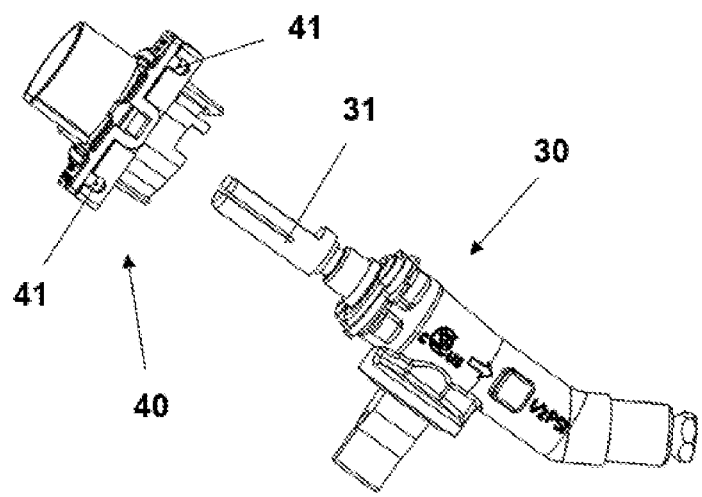
FIG. 3 shows an exploded side view of the assembly formed by a gas valve and an electric switch associated with the gas valve, of the gas cooking appliance of FIG. 1.
Figure 4:
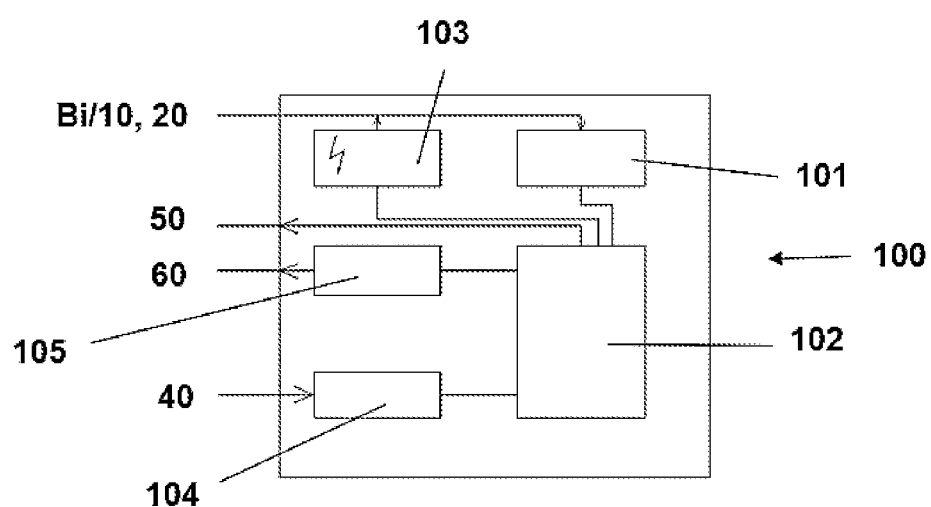
FIG. 4 shows a schematic view of the control unit of the gas cooking appliance of FIG. 1.

FIG. 1 shows a schematic view of an embodiment of a gas cooking appliance 200 according to the invention, which in this case corresponds to a gas barbecue. FIG. 2 shows a partial schematic view of the gas cooking appliance 200 of FIG. 1, FIG. 3 shows an exploded side view of the assembly formed by a gas valve 30 and an electric switch 40 associated with the gas valve 30, of the gas cooking appliance 200 of FIG. 1, and FIG. 4 shows a schematic view of the control unit 100 of the gas cooking appliance 200 of FIG. 1.

The gas cooking appliance 200 comprises three gas burners B1-B3, an electrode 10 associated with each burner B1-B3 for igniting the flame in the burner B1-B3 when it is activated, a flame sensor 20 associated with each burner B1-B3 for monitoring the presence or absence of the flame when it is activated, the flame sensor 20 being configured to provide a detection signal based on the presence or absence of the flame, gas valve 30 for regulating the gas flow reaching each burner B1-B3 from a gas conduit 32, an electric switch 40 associated with an actuator 31 and configured to be activated when the actuator 31 is actuated, and a control unit 100 electrically connected to the electrodes 10, the flame sensors 20, and the switches 40, which is activated when the switch 40 is activated, the control unit 100 activating the electrodes 10 and the flame sensors 20 of the burners B1-B3, the control unit 100 determining the presence or absence of flame produced in the gas burners B1-B3, based on the reception of the detection signals sent by the flame sensors 20.

The gas cooking appliance 200 also comprises a bistable gas valve 50, of the ON-OFF type, arranged in the gas conduit 32, fluidly communicating a gas supply 33 with the gas valves 30, the valve 50 being electrically connected to the control unit 100. The valve 50, when it is in a stable open position, not consuming electric current in the position, allows the passage of gas towards the gas valves 30, and when it in a stable closed position, prevents the passage of gas towards the gas valves 30, the control unit 100 acting on the valve 50 to make it pass from a stable open position to a stable closed position, and vice versa, by means of current pulses. The control unit 100 is configured to open the valve 50, and arrange it in the stable open position when the gas cooking appliance 200 is turned on, sending an electric current pulse to the valve 50 when a switch 40 is activated, starting from the situation in which the gas cooking appliance 200 is turned off. The gas flow can thus reach the gas valves 30.

The control unit 100 is also configured to sequentially monitor in time cycles T the presence or absence of flame in the burners B1-B3. Therefore, only one of burner B1-B3 is monitored from the control unit 100 each time, only its associated flame sensor 20 being activated for a time. When the defined time cycle T, which in this embodiment of the gas cooking appliance 200 is 10 seconds as indicated by the standard of gas appliances, elapses, all the burners B1-B3, will have been monitored and the monitoring will start from the first burner.

In this embodiment of the gas cooking appliance 200, the gas valve 30 is a manually driven gas tap comprising the actuator 31 which is a drive shaft. The gas valve 30 is of the type comprising a rotary gas flow-regulating member (not shown in the figures), which is arranged in the body of the gas valve 30, and the actuator 31 is mechanically coupled to the regulating member. The gas valve 30 comprises a gas inlet fluidically communicated with the gas supply 33, a gas outlet fluidically communicated with the associated burner B1-B3, and the regulating member is fluidically arranged between the gas inlet and outlet. The manual actuator 31 is mechanically coupled to the regulating member, and allows regulating the gas flow in the gas valve 30 when it is actuated. Each gas valve 30 comprises a knob 34 which is coupled to the actuator 31 at one end, and the user can manipulate the gas valve 30 by acting on the knob 34.

In this embodiment of the gas cooking appliance 200, the actuator 31, and therefore the regulating member, rotates in an angle of rotation between an initial position corresponding to an angular position of 0°, in which the gas valve 30 is closed and does not supply any gas flow to the associated burner B1-B3, and a final position corresponding to an angular position of for example 270°, in which the gas valve 30 supplies a determined gas flow, which is a minimum gas flow. The gas supply flow at the outlet of the gas valve 30 starts at an angular position of 45°, reaching a maximum gas flow at an angle of 90°. Then, and with the rotation, the gas flow decreases by an intermediate gas flow rate, until reaching at 270° the minimum gas flow.

The range of angular positions is referred to as range of actuation, corresponding to the actuator 31, in this embodiment of the gas cooking appliance 200, a first range of actuation between 45° and 270°. The range of angular positions corresponding to a gas flow which is supplied to the corresponding associated burner B1-B3 from the gas valve 30 is smaller, between 45° and 270°. Each switch 40 is associated with each actuator 31 of each gas valve 30, as shown in FIG. 3, for example, mechanically by means of a cam (not shown in the figures) which in this embodiment of the gas cooking appliance 200 comprises the switch 40 therein. The actuator 31 of the gas valve 30 has in this embodiment a D-shaped area which is coupled to the cam of the switch 40, such that they both rotate integrally. The coupling is configured such that the switch 40 is activated, and therefore closes an electric circuit, in a second range of actuation, from for example an angle of 30°, before the gas flow starts to exit, to 270°, which is smaller than the first range of actuation.

In this embodiment of the gas cooking appliance 200, the switches 40 are electrically connected in parallel with the control unit 100, each of the switches 40 being connected to the control unit 100 by means of a first electrical conductor common to all the switches 40, and a second individualized electrical conductor for each of the switches 40 (see in FIG. 2 the connections of the electrical conductors), such that the activation of a switch 40, the respective associated actuator 31 of which has been actuated, allows the activation of the control unit 100. Thus, the control unit 100 receives the signals of the switches 40 which have been activated, the control unit 100 knows which switch 40 has been activated, and therefore with which burner B1-B3 is associated, and the control unit 100 knows which gas valves 30 have been operated to regulate the gas flow towards the associated burners B1-B3. The control unit 100 activates the electrodes 10 and the flame sensors 20 of all burners B1-B3, to ignite the flame on said burners B1-B3, the control unit 100 being configured to be able to sequentially monitor in time cycles T the presence or absence of flame in all burners B1-B3. In another embodiment of the gas cooking appliance 200, the control unit 100 could activate the electrodes 10 and the flame sensors 20 of the burners B1-B3, the respective associated switches 40 of which have been activated, the control unit 100 being configured to be able to sequentially monitor in time cycles T the presence or absence of flame in only those burners in which the respective associated switches 40 have been activated.

Due to the fact that the monitoring of the presence or absence of flame in the burners B1-B3 is sequential, needs much less electrical energy for its operation due to the fact that, in addition, the gas valves 30 are not electrically powered. As a result of such a low energy consumption, the control unit 100 can be electrically powered only from a power source 110 formed by two batteries arranged in series, preferably of the AA type, at a voltage V of 1.5 volts each, defining a power supply voltage of the control unit 100 of 3 volts. Thus, long cooking work periods are obtained with the gas cooking appliance 200, of more than 300 hours, with a required electric power of less than 0.001 w.

The valve 50 comprises a manual actuator 51 accessible from the outside, and configured to arrange the valve 50 in the stable open position manually. Thus, if the power source 110, the two AA batteries, has been used up without being able to replace it, or if it has been spoilt, leaving the gas cooking appliance 200 without its energy supply, the gas cooking appliance 200, unlike the cooking appliance described in US2016/0348916A1, can be used to carry out cooking processes. To that end, the user will manually press the manual actuator 51 of the valve 50, opening the passage of gas towards the gas valves 30, and will ignite the flame in the burners B1-B3 by means of a match, a lighter, etc.

In this embodiment of the gas cooking appliance 200, each electrode 10 and each flame sensor 20 associated with each respective burner B1-B3 form a single part, although in other embodiments they can be independent parts which only require the adjustment of the corresponding electric connections with the control unit 100.

The control unit 100 is configured to generate detection electric voltage signals at a voltage V1 of, for example, 100 volts, greater than the power supply voltage V, the detection voltage signals being sent to the flame sensors 20 for their activation to carry out the monitoring process. The voltage V1 allows the flame to be ionized and be electrically conductive, such that the control unit 100 can determine whether or not an electric current continuity exists, and thus determine if there is presence or absence of flame in the respective burner B1-B3. The control unit 100, which is electrically powered by means of the power source 110, comprises a management unit 102 managing the control functions assigned to the control unit 100, and comprises a multiplexer. The control unit 100 also comprises a flame detection device 101 electrically connected to the flame sensors 20, which is electrically powered at the voltage V. The detection device 101 is electrically communicated with the management unit 102, and comprises a voltage booster which allows increasing the voltage from the voltage V to the voltage V1, and which generates the detection voltage signals at the voltage V1 which the multiplexer sends in a multiplexed manner, sequentially, to each of the flame sensors 20 associated with each burner B1-B3. Thus, a single detection device 101 is enough to carry out the sequential monitoring function.

The control unit 100 is also configured to generate ignition electric voltage signals at a voltage V2 of, for example, 10 kilovolts, greater than the power supply voltage V, the ignition voltage signals being sent to the electrodes 10 for their activation to ignite the flame in the burners B1-B3. The control unit 100 comprises a spark generator 103 electrically connected to the electrodes 10 and to the management unit 102, being electrically powered at the voltage V, the spark generator 103 comprising, in this embodiment of the gas cooking appliance 200, a high-voltage transformer which, powered at the voltage V, increases the voltage to the voltage V2, and generates the ignition voltage signals at the voltage V2 which are sent to each of the electrodes 10 associated with each burner B1-B3. Thus, in each electrode 10 a series of sparks is formed which allows igniting each burner B1-B3. With this configuration of the control unit 100, in this embodiment of the gas cooking appliance 200, the ignition voltage signals are sent to all the electrodes 10, although in another embodiment of the gas cooking appliance 200 the ignition voltage signals could only be sent to the burners B1-B3 the switches 40 of which have been activated.

The control unit 100 also comprises a connection unit 104 electrically connected to the management unit 102 that receives the electrical conductors from the switches 40, said connection unit 104 sending the corresponding on-off signals to the management unit 102 to each switch 40.

Figure 5:
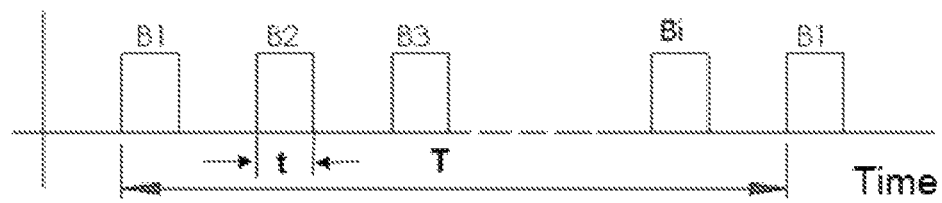
FIG. 5 shows a diagram relating the sequence of monitoring of the flame of gas burners of a gas cooking appliance in a time cycle T, with the elapsed time.

FIG. 5 shows a diagram relating the sequence of monitoring of the flame, of burners Bi of any gas cooking appliance comprising the features defined above for the gas cooking appliance 200, in a time cycle T, with the elapsed cooking time. The sequencing is carried out such that the sending of the ignition voltage signal to the electrode 10, the sending of the detection voltage signal to the flame sensor 20, and the reception of the detection signal from the flame sensor 20, in each burner Bi from/to the control unit, is carried out in a concatenated manner in a time cycle t, the sum of times t of the burners Bi being less than time cycle T. Thus, in the embodiment of the gas cooking appliance 200 described, the time cycle T is 10 seconds, which means that at least each 10 seconds each burner B1-B3 is monitored, and the time cycle t is less than 1 second. In this embodiment, the electric consumption is reduced at least to a tenth with respect to a gas cooking appliance without sequencing of the monitoring. In other embodiments of the gas cooking appliance 200 (not shown in the figures), the sending/reception of the detection voltage signals and of the detection signals of the monitoring of the flame in the burners, and the sending of the ignition voltage signals, are carried out independently, keeping the monitoring of the flame in a sequential manner.

When the respective flame sensor 20 of all burners B1-B3 sends a flame presence detection signal to the control unit 100, the control unit 100 is configured to stop sending ignition voltage signals to the electrodes 10, because it means that the burners B1-B3 have been ignited and have a flame. When a flame sensor 20, either in the initial ignition moment of the burner B1-B3, or subsequently after the flame has been ignited in the burner B1-B3, sends a flame absence detection signal, the control unit 100 is configured to again send ignition voltage signals to the electrodes 10 for a determined re-ignition time period Tr, which in this embodiment is 8 seconds.

Figure 6:
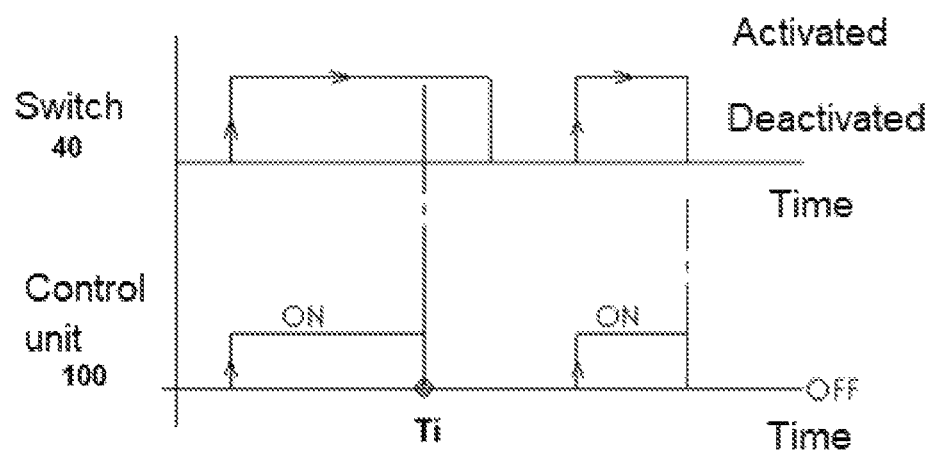
FIG. 6 shows a diagram relating an electric switch and the control unit of the gas cooking appliance of FIG. 1 with time, wherein after an inactive time Ti of the gas cooking appliance the control unit is deactivated, and it is activated again after deactivating and reactivating the switch.

FIG. 6 shows a diagram relating an electric switch 40 and the control unit 100 of the gas cooking appliance 200 with the time. The control unit 100 is also configured to be deactivated, and therefore the gas cooking appliance 200 turned off, when, having at least one burner B1-B3 with a flame, there is no change of state in the switch 40 after an inactive time Ti has elapsed, when the control unit 100 receives a flame absence detection signal from a flame sensor 20 after the re-ignition time period Tr has elapsed, or when all the activated switches 40 have stopped being activated. In the embodiment of the gas cooking appliance 200 shown, the defined inactive time Ti is 3 hours. To activate the control unit 100 again, and therefore to start the gas cooking appliance 200 again, it is enough to deactivate a switch 40 which is activated and activate it again, or activate a switch 40 which was not activated.

This embodiment of the gas cooking appliance 200 also comprises illumination means 60 and acoustic means 70 which inform the user about the state in which the gas cooking appliance 200 is. The illumination means 60 are arranged in the knobs 34, although in other embodiments of the gas cooking appliance 200 (not shown) they can be in other locations, such as for example the panel of the appliance 200, such that when any expected situation occurs which must be notified to the user, the illumination means 60 emit a light in the knobs 34 which can vary in color and/or intensity and/or frequency. The notification to the user preferably occurs when the flame has been ignited in a burner B1-B3, when the flame has not been ignited in a burner B1-B3 after the re-ignition time Tr has elapsed, when in a burner B1-B3 which was ignited with a flame the respective flame sensor 20 sends a flame absence detection signal, or when, after closing the gas flow in the gas valves 30 by acting on the actuators 31 passing them to the closed position, a determined residual heat threshold is exceeded in the gas cooking appliance 200, this threshold being defined for example with respect to the cooking time elapsed in the gas cooking appliance 200. The acoustic means 70 can have the same function as the illumination means 60, being arranged in this embodiment of the gas cooking appliance 200 in the control unit 100.

The control unit 100 also comprises a signal unit 105 electrically connected to the management unit 102 and to the illumination means 60 and the acoustic means 70, said signal unit 105 sending the corresponding signals to said illumination means 60 and said acoustic means 70.

The control unit 100 is connected, in this embodiment of the gas cooking appliance 200, to a communications unit 120 which is configured to be connected to other external electronic devices. The connection can be wireless from the control unit 100 by means of Bluetooth, Wi-Fi, etc., with external devices such as temperature sensors, remote control 130, such as smartphone or tablet, etc., or can also be a cable connection, series connection, USB, etc., to devices such as the communications unit 120 with a touch screen, which can in turn furthermore have wireless connection to other external devices such as the temperature sensors, the remote control 130, such as a smartphone or tablet, etc.

The method for controlling the presence or absence of flame of a plurality of burners Bi of gas of the invention is implemented for example with a gas cooking appliance 200 such as that described above. The gas cooking appliance 200 comprises three gas burners B1-B3 to which there reaches gas flow in use, an electrode 10 associated with each burner B1-B3, a flame sensor 20 associated with each burner B1-B3 configured to provide a detection signal based on the presence or absence of the flame, an electric switch 40 associated with an actuator and configured to be activated when the actuator is actuated, and a control unit 100 electrically connected to the electrodes 10, the flame sensors 20, and the switch 40, which is activated when the switch 40 is activated, the control unit 100 activating the electrodes 10 and the flame sensors 20 of the burners B1-B3.

In this embodiment of the gas cooking appliance 200, the gas valve 30 is a manually driven gas tap comprising the actuator 31 which is a drive shaft. The gas valve 30 allows the fluidic communication of the gas between a gas supply 33 and the associated burner B1-B3. The manual actuator 31 allows regulating the gas flow in the gas valve 30 when it is actuated. Each switch 40 is associated with each actuator 31 of each gas valve 30, as shown in FIG. 3, such that upon operating on the actuator 31 for regulating the gas flow towards the associated burner B1-B3, the associated switch 40 is activated and the signal reaches the control unit 100, activating it. In this embodiment of the gas cooking appliance 200, the switches 40 are electrically connected in parallel with the control unit 100, such that the activation of a switch 40, the respective associated actuator 31 of which has been actuated, allows the activation of the control unit 100.

The gas cooking appliance 200 also comprises a bistable gas valve 50, of the ON-OFF type, arranged in the gas conduit 32, fluidically communicating a gas supply 33 with the gas valves 30, the valve 50 being electrically connected to the control unit 100. The valve 50 comprises a manual actuator 51 accessible from the outside, and configured to arrange the valve 50 in a stable open position manually.

Figure 7:
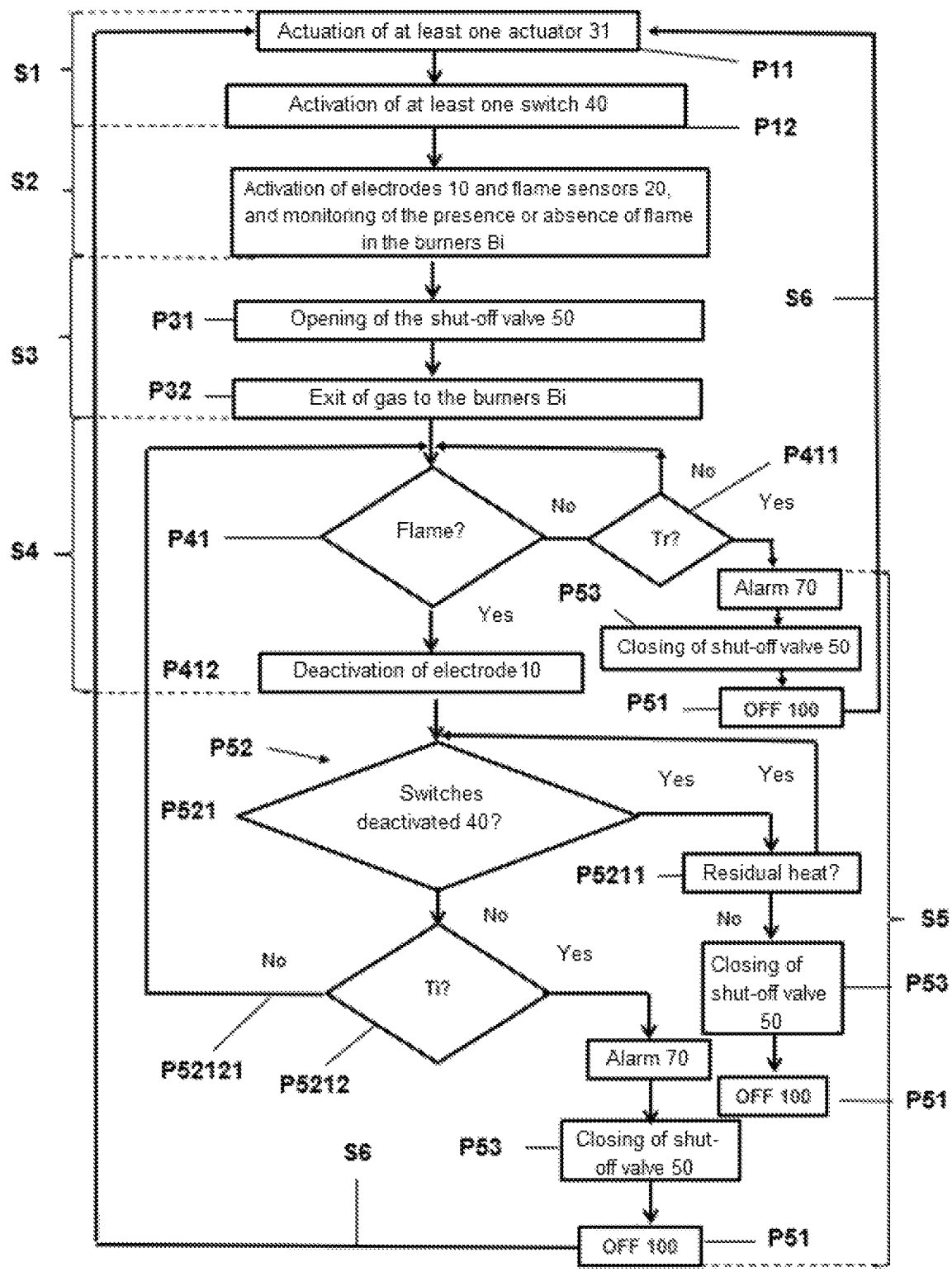
FIG. 7 shows a flow chart of an embodiment of a method for controlling the presence or absence of flame of the gas burners of the gas cooking appliance of FIG. 1.

FIG. 7 shows in a flow chart the steps of an embodiment of the method for controlling the presence or absence of flame of the plurality of gas burners Bi. The method comprises:

a step of activating the control unit 100 S1, comprising a phase of actuation of the actuator 31 P11 in which a knob 34 coupled to the actuator 31 is turned and the gas valve 30 is arranged in a range of actuation with gas flow, and a phase of activation of the switch 40 P12 in which the associated switch 40 is activated and the control unit 100 is activated, a step of activating the electrodes 10 and the flame sensors 20 S2, associated with the burners B1-B3, for igniting the flame and for monitoring the presence or absence of the flame in the burners B1-B3. In the embodiment of the gas cooking appliance 200 shown, the control unit 100 activates all the electrodes 10 and the flame sensors 20 of the burners B1-B3, and monitors all the burners B1-B3. The monitoring of the presence or absence of the flame in the burners B1-B3 is carried out sequentially in time cycles T, such that only one burner B1-B3 is monitored from the control unit 100 each time, only its associated flame sensor 20 being activated for a time, the step S2 comprising a sequence of activation of the electrode 10, of activation of the flame sensor 20, and sending of the detection signal, in each burner B1-B3, from/to the control unit 100. In another embodiment of the gas cooking appliance 200, the control unit 100 could activate the electrodes 10 and the flame sensors 20 of the burners in which the respective associated switches 40 have been activated, the control unit 100 being configured to be able to sequentially monitor in time cycles T the presence or absence of flame in the burners B1-B3, the respective associated switches 40 of which have been activated.

a step of opening the passage of gas S3, for igniting the flame in the burners B1-B3, comprising an opening phase P31 wherein the control unit 100 arranges the valve 50 in a stable open position, and a gas exit phase P32, in which the gas flows from the gas conduit 32 towards the gas valves 30, and from the gas valves 30 towards the associated gas burners B1-B3, a step of determining the presence or absence of flame S4 ignited in the gas burners B1-B3, based on the reception of the detection signals sent by the respective flame sensors 20, the step S4 comprising a flame existence verification phase P41, wherein the decision is made to:
  carry out a re-ignition phase P411 of the burner B1-B3 for a determined re-ignition time Tr, if the control unit 100 receives a flame absence detection signal from the flame sensor 20, or to
  carry out a deactivation phase of the electrodes 10 P412 if the control unit 100 receives a flame presence detection signal from all the flame sensors 20, a step of turning off the gas cooking appliance 200 S5, deactivating the control unit 100, the step S5 comprising:
  a turning off phase P51 if once the re-ignition time Tr of the re-ignition phase P411 has elapsed, the flame in the burner Bi has not been ignited, and
  an activity verification phase P52 of the activity of the gas cooking appliance 200, after the deactivation phase P412 of the electrodes 10, comprising a verification phase of the activated switches 40 P521 wherein:
    if all the switches 40 are deactivated, the turning off phase P51 is carried out after verifying in a residual heat verification phase P5211 that a determined threshold is not exceeded in the gas cooking appliance 200, and
    at least one switch 40 is kept activated and the respective associated burner B1-B3 is kept ignited and with a flame, a verification phase of the active time Ti of the gas cooking appliance 200 P5212 is carried out, in which:
      the turning off phase P51 is carried out, when the determined time Ti has elapsed without a change of state of at least one switch 40, or
      an activity continuation phase P52121 is carried out, returning to the flame existence verification phase P41,
  a closing phase P53 before the turning off phase P51, the valve 50 passing to a stable closed position preventing the passage of gas by means of the control unit 100, and a step of re-igniting the gas cooking appliance 200 S6, after the turning off phase P51 carried out in the re-ignition phase P411, or after the turning off phase P51 carried out after the verification phase of the activity of the gas cooking appliance 200 P5212, an activated switch 40 being deactivated and activated again, or activating a switch 40 which was deactivated.

Figure 8:
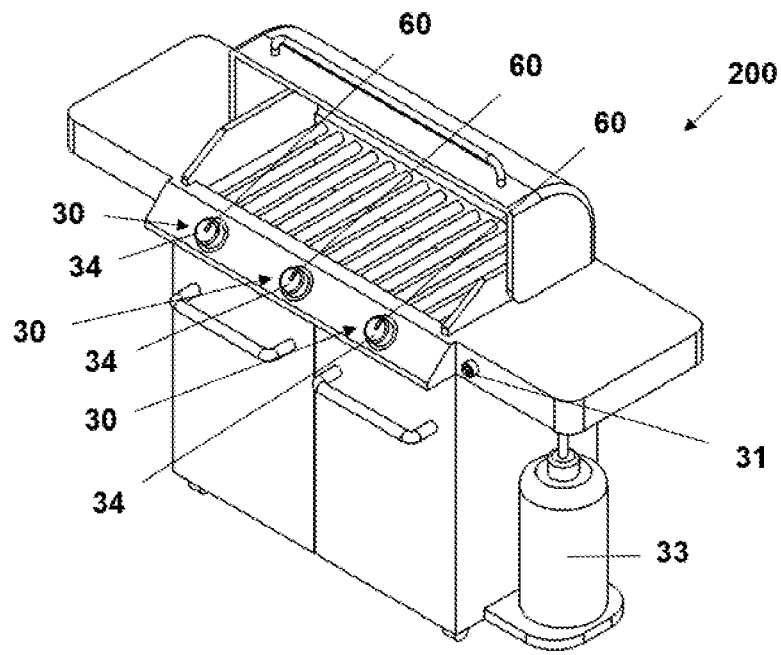
FIG. 8 shows a schematic view of a gas cooking appliance according to a second embodiment.

FIG. 8 shows a schematic view of a second embodiment of a gas cooking appliance 200.

Figure 9:
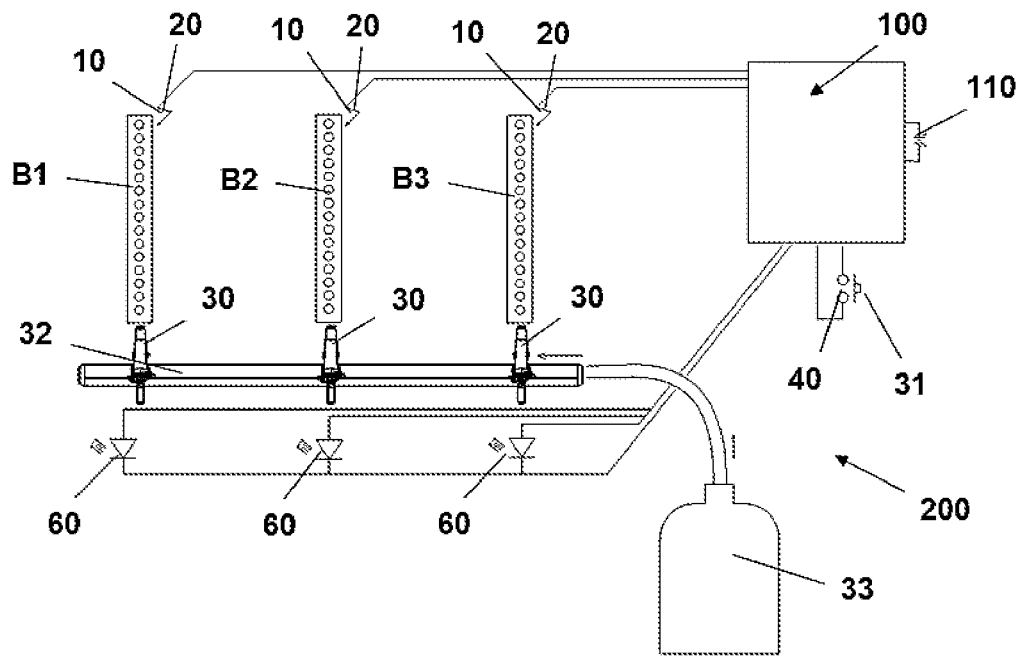
FIG. 9 shows a partial schematic view of the gas cooking appliance of FIG. 8.

FIG. 9 shows a partial schematic view of the gas cooking appliance 200 of FIG. 8.

The gas cooking appliance 200 shown in this second embodiment differs from the gas cooking appliance of the first embodiment, in that it is a simpler gas cooking appliance, with fewer components, in which the electric switches associated with the gas valves are dispensed with, comprising a single switch 40 associated with a respective actuator 31, the actuator 31 being a push-button. The switch 40 is electrically connected with the control unit 100, such that the activation of the switch 40, upon pressing the associated actuator 31, allows the activation of the control unit 100. The control unit 100 activates the electrodes 10 and the flame sensors 20 associated with the burners B1-B3, the control unit 100 sequentially monitoring in time cycles T the presence or absence of flame in the burners B1-B3.

When the user wants to turn on the gas cooking appliance 200 of this second embodiment, a barbecue in the example shown, he/she presses the push-button 31 activating the switch 40, the control unit 100 being activated, and operates the gas valves 30, opening the passage for the gas flow, of the burners B1-B3 which he/she wants to turn on. The control unit 100 activates the spark generator 103, activating the electrodes 10 and the flame sensors 20 associated with all burners B1-B3. In a version of this embodiment of the gas cooking appliance 200, the user will keep the actuator 31 pressed, allowing to have the spark generator 103 activated through the control unit 100, until the flame is ignited in the activated burners B1-B3, the light associated with the associated burners B1-B3 being turned on, and the spark generator 103 will cease to be activated when the user stops pressing button 31. In other version of the second embodiment of the gas cooking appliance 200, pressing the actuator 31 allows to activate directly the spark generator 103, the flame being ignited in the burners B1-B3, and the spark generator 103 will cease to be activated when the user stops pressing button 31.

The control unit 100 is configured to be deactivated when, after receiving the flame presence detection signal from the flame sensors 20 associated with those burners B1-B3 whose flame has been lit, it receives a flame absence detection signal from all flame sensors 20, a waiting time Te having elapsed. The control unit 100 does not know if the flame has been extinguished due to lack of gas, due to a problem, or because the user has closed the gas valve 30, and therefore cannot perform a re-ignition.

Figure 10:
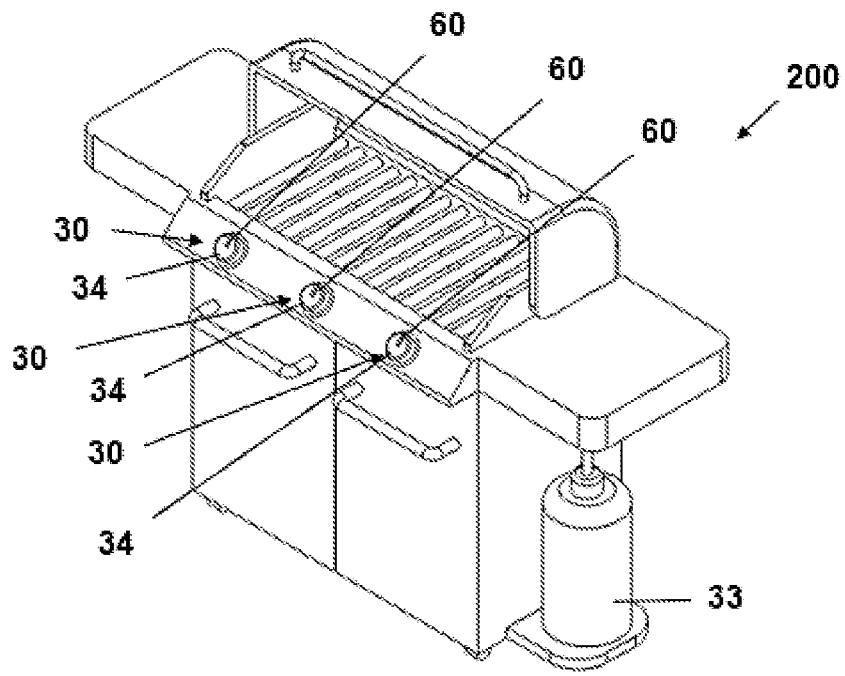
FIG. 10 shows a schematic view of a gas cooking appliance according to a third embodiment.
Figure 11:
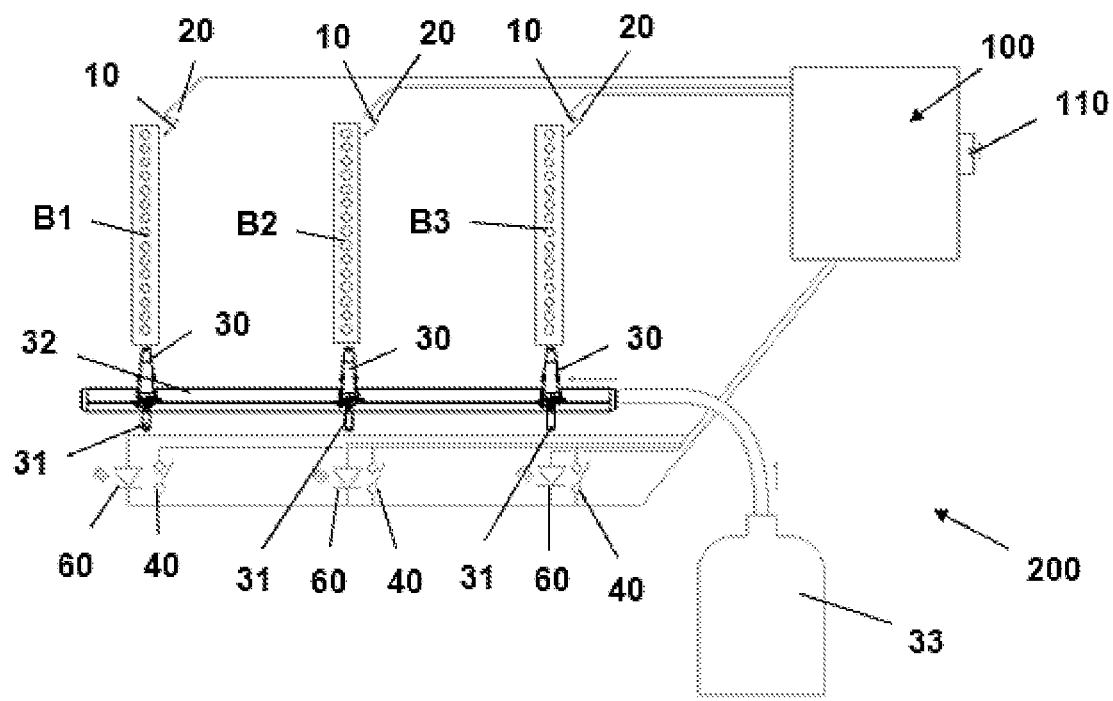
FIG. 11 shows a partial schematic view of the gas cooking appliance of FIG. 10.

FIG. 10 shows a schematic view of third embodiment of a gas cooking appliance 200. FIG. 11 shows a partial schematic view of the gas cooking appliance 200 of FIG. 10. The gas cooking appliance 200 shown in this embodiment differs from the gas cooking appliance of the second embodiment, in that, as in the first embodiment of the gas cooking appliance, comprises an electric switch 40 associated with each actuator 31 of each gas valve 30, and configured to be activated when actuator 31 is actuated. As in the first embodiment, the actuator 31 is the drive shaft of the gas valve 30.

In this third embodiment of the gas cooking appliance 200, the switches 40 are electrically connected in parallel with the control unit 100, each of the switches 40 being connected to the control unit 100 by means of a first and second electrical conductors common to all the switches 40 (see in FIG. 10 the connections of the electrical conductors), such that the activation of a switch 40, the respective associated actuator 31 of which has been actuated, allows the activation of the control unit 100. Thus, the control unit 100 receives signals from switches 40 that have been activated, but the control unit 100 does not know which switch 40 has been activated, and therefore does not know with which burner B1-B3 is associated. and the control unit 100 does not know which gas valves 30 have been operated to regulate the gas flow towards the associated burners B1-B3.

A feature of the gas cooking appliance 200 of this third embodiment, is that the switch 40 is only activated in a sector of the angular actuation range of the actuator 31, for example between 60° and 90° where a gas flow is defined, so that the user, to ignite the flame in a burner B1-B3, turns the knob 34 of the gas valve 30 and positions it in said sector. The control unit 100 is activated and activates the spark generator 103, activating the electrodes 10 and the flame sensors 20 associated with all burners B1-B3. The spark generator 103 will be activated while the knob 34 is positioned in the defined sector of the angular actuation range of the actuator 31. When the user observes that the lights, corresponding to the burners B1-B3 that want to lit the flame, have been turned on, will turn the knob 34 positioning it in an angular position corresponding to a desired gas flow for the burner B1-B3, and the spark generator 103 will cease to be activated when the knob 34 is out of the sector defined to ignite the sparks in the electrodes 10. If the user does not change the position of the knob 34, the spark generator 103 will remain activated.

Figure 12:
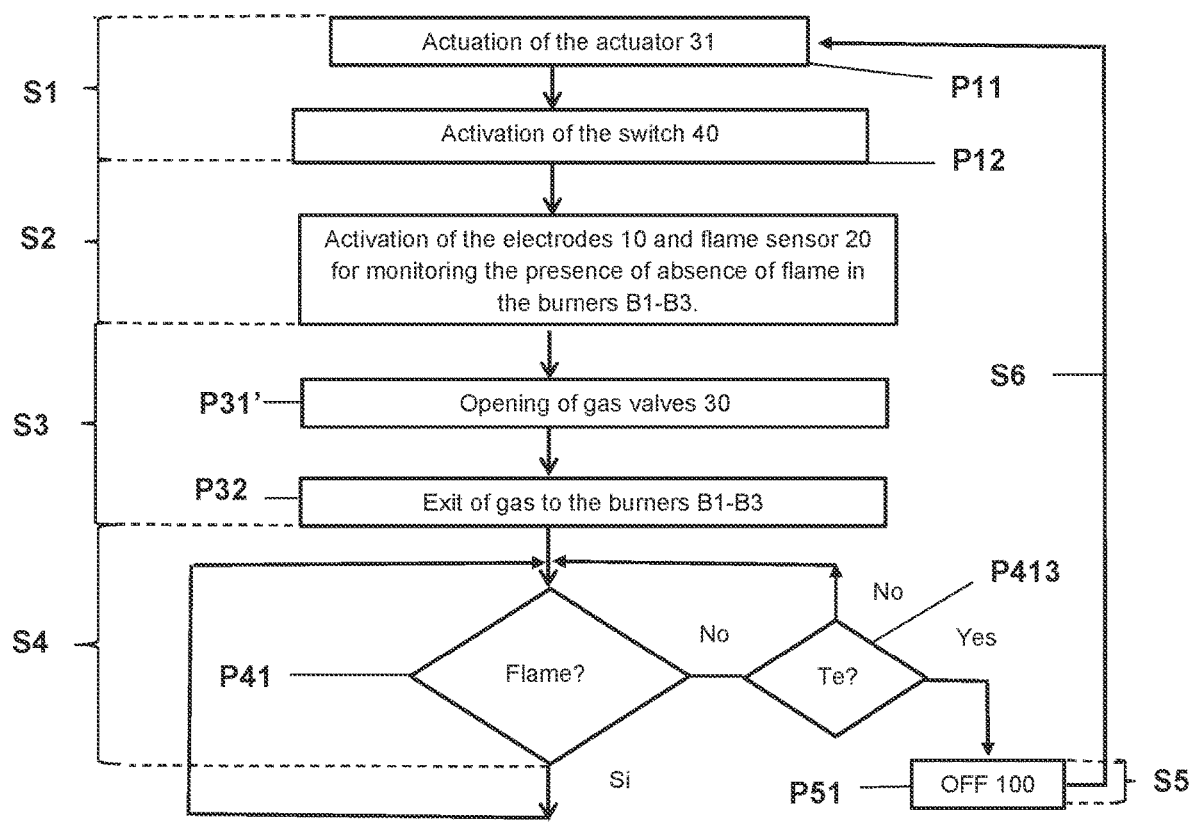
FIG. 12 shows a flow chart of a second method for controlling the presence or absence of flame of the gas burners of the gas cooking appliance of FIGS. 8 and 10.

FIG. 12 shows a flow chart of a second embodiment of the method of the invention for controlling the presence or absence of flame of the gas burners of the gas cooking appliance 200 of FIGS. 8 and 10. The method shown in FIG. 12 comprises:

a step of activating the control unit 100 S1, comprising an actuation phase of the actuator 31 P11 in which the actuator 31 is actuated, and an activation phase for activating the switch 40 P12 in which the associated switch 40 is activated and the control unit 100 is activated, a step of activating the electrodes 10 and the flame sensors 20 S2, associated with the burners B1-B3, for igniting the flame and for monitoring the presence or absence of the flame in the burners B1-B3. All the electrodes 10 and the flame sensors 20 of the burners B1-B3 are activated from the control unit 100, all the burners B1-B3 being monitored. The monitoring of the presence or absence of the flame in the burners B1-B3 is carried out sequentially in time cycles T, such that only one burner B1-B3 is monitored from the control unit 100 each time, only its associated flame sensor 20 being activated for a time, the step S2 comprising a sequence of activation of the electrode 10, of activation of the flame sensor 20, and sending of the detection signal, in each burner B1-B3, from/to the control unit 100.

a step of opening the passage of gas S3, for igniting the flame in the burners B1-B3, comprising an opening phase P31' for opening the gas valves 30, wherein the user acts on the gas valves 30, the associated burners B1-B3 of which are to be ignited with the flame, opening the passage of gas, and a gas exit phase P32, in which the gas flows from the gas conduit 32 towards the gas valves 30, and from the gas valves 30 towards the associated gas burners B1-B3, a step of determining the presence or absence of ignited flame S4 in the gas burners B1-B3, based on the reception of the detection signals sent by the respective flame sensors 20, the step S4 comprising a flame existence verification phase P41, wherein the decision is made to:

carry out a waiting phase P413 of the burner B1-B3 during a determined waiting time Te, if the control unit 100 receives a flame absence detection signal from the flame sensor 20, after having received a flame presence detection signal, or return to the flame existence verification phase P41, carrying out a loop function, a step of turning off the gas cooking appliance 200 S5, in which:

if the waiting time Te has elapsed without a flame in all the burners B1-B3, a turning off phase P51 occurs in which the control unit 100 stops being electrically powered, and if the waiting time Te, the burner B1-B3 being without a flame, has not elapsed, there is a return to the flame existence verification phase P41, carrying out a loop function.

a step of re-igniting the gas cooking appliance 200 S6, after the turning off phase P51, the activated switch 40 being deactivated and activated again, or activating the switch 40 which was deactivated.

In following clauses are disclosed additional embodiments.

Clause 1: A gas cooking appliance comprising:

a plurality of gas burners that are each configured to produce a flame, an electrode associated with each burner (Bi) for igniting the flame in the burner (Bi) when it is activated, a flame sensor (20) associated with each burner (Bi) for monitoring the presence or absence of the flame when it is activated, the flame sensor (20) being configured to provide a detection signal based on the presence or absence of the flame, a gas valve (30) for regulating the gas flow reaching each burner (Bi) from a gas conduit (32), at least one electric switch (40) associated with an actuator (31) and configured to be activated when the actuator (31) is actuated, and a control unit (100) electrically powered at a voltage V, and electrically connected to the electrodes (10), the flame sensors (20), and the switch (40), which is activated when the switch (40) is activated, the control unit (100) activating the electrodes (10) and the flame sensors (20) of the burners (Bi), the control unit (100) determining the presence or absence of flame produced in the gas burners (Bi), based on the reception of the detection signals sent by the flame sensors (20), the control unit (100) is configured to sequentially monitor in time cycles T the presence or absence of flame in the burners (Bi).

Clause 2: A gas cooking appliance according to claim 1, wherein the control unit (100) is electrically powered from a power source (110) formed by at least one battery at the voltage V, preferably two AA batteries.

Clause 3: A gas cooking appliance according to claim 1 or 2, wherein the control unit (100) is configured to generate detection voltage signals at a voltage V1 greater than the power supply voltage V, the control unit (100) comprising a multiplexer sequentially sending detection voltage signals and receiving the detection signals to/from the flame sensors (20) to monitor the presence or absence of the flame of the burners (Bi).

Clause 4: A gas cooking appliance according to claim 3, wherein the control unit (100) is configured to generate ignition voltage signals at a voltage V2 greater than the power supply voltage V, sending the ignition voltage signals to the electrodes (10) to ignite the flame in the burners (Bi).

Clause 5: A gas cooking appliance according to claim 4, wherein the sending of the detection voltage signal, the sending of the ignition voltage signal, and the reception of the detection signal, from/to the control unit (100), are carried out in a concatenated manner in a time cycle t, the sum of times t of the burners (Bi) being less than the time cycle T.

Clause 6: A gas cooking appliance according to claim 4 or 5, wherein the control unit (100) comprises a flame detection device (101) electrically connected to the flame sensors (20) and electrically powered at the voltage V, the detection device (101) generating the detection voltage signals at the voltage V1, the control unit (100) comprising a management unit (102) which comprises the multiplexer and is electrically communicated with the detection device (101).

Clause 7: A gas cooking appliance according to claim 6, wherein the control unit (100) comprises a spark generator (103) electrically connected to the electrodes (10) and to the management unit (102), being electrically powered at the voltage V, the spark generator (103) generating the ignition voltage signals at the voltage V2.

Clause 8: A gas cooking appliance according to any of the preceding claims, comprising a single switch (40) associated with a respective actuator (31).

Clause 9: A gas cooking appliance according to claim 8, wherein the actuator (31) is a push-button.

Clause 10: A gas cooking appliance according to claim 8 or 9, wherein the control unit (100) is configured to be deactivated when, after receiving a flame presence detection signal from the flame sensors 20, it receives a flame absence detection signal from all the flame sensors (20), a waiting time Te has elapsed.

Clause 11: A gas cooking appliance according to any of claims 4 to 7, comprising a switch (40) associated with each gas valve (30), the control unit (100) being activated when at least one of the switches (40) is activated.

Clause 12: A gas cooking appliance according to claim 11, wherein each gas valve (30) comprises an actuator (31) for regulating the gas flow when it is actuated, the switch (40) respective being associated with the actuator (31).

Clause 13: A gas cooking appliance according to claim 12, wherein the actuator (31) acts by regulating the gas flow of the gas valve (30) in a first range of actuation, and the switch (40) is activated at any point of a second range of actuation, the second range of actuation being less than or equal to the first range of actuation.

Clause 14: A gas cooking appliance according to any of claims 11 to 13, wherein the control unit (100) activates the electrodes (10) and the flame sensors (20) of the burners (Bi) the respective associated switches (40) of which have been activated, the control unit (100) being configured to sequentially monitor in time cycles T the presence or absence of flame in the burners (Bi) the respective associated switches (40) of which have been activated.

Clause 15: A gas cooking appliance according to any of claims 11 to 14, wherein the control unit (100) is configured to be deactivated when all the activated switches (40) stop being activated.

Clause 16: A gas cooking appliance according to any of claims 11 to 15, wherein the control unit (100) is configured to stop sending ignition voltage signals to the electrodes (10), when the respective flame sensor (20) sends a flame presence detection signal, and again sends ignition voltage signals to the electrode (10), for a determined time period Tr, when the respective flame sensor (20) sends a flame absence detection signal.

Clause 17: A gas cooking appliance according to claim 16, wherein the control unit (100) is configured to be deactivated when at least one burner (Bi) is ignited with a flame and a time Ti has elapsed without a change of state in the burner (Bi), or when it receives a flame absence detection signal from a flame sensor (20) after the time period Tr has elapsed.

Clause 18: A gas cooking appliance according to any of the preceding claims, wherein each electrode (10) and each flame sensor (20) associated with each respective burner (Bi) form a single part.

Clause 19: A gas cooking appliance according to any of the preceding claims, comprising a bistable gas valve (50) of gas arranged in the gas conduit (32), fluidically communicating a gas supply (33) with the gas valves (30), the valve (50) being electrically connected to the control unit (100), and the control unit (100) being configured to open the valve (50) by sending an electric current pulse when a switch (40) is activated, the gas cooking appliance (200) being turned off.

Clause 20: A gas cooking appliance according to claim 19, wherein the valve (50) comprises a manual actuator (51) accessible from the outside, and configured to arrange the valve (50) in a stable opening position manually.

Clause 21: A gas cooking appliance according to any of the preceding claims, comprising illumination means (60) and/or acoustic means (70) which inform the user about the state in which the gas cooking appliance (200) is, preferably when a burner (Bi) has been ignited, when a burner (Bi) has not been ignited or has been turned off, or when, after closing the gas flow in the gas valves (30), a determined residual heat threshold is exceeded in the gas cooking appliance (200).

Clause 22: A gas cooking appliance according to claim 21, comprising a knob (34) coupled to each gas valve (30), the illumination means (60) being arranged in the knobs (34).

Clause 23: A gas cooking appliance according to any of the preceding claims, wherein the control unit (100) is connected to a communications unit (120) which is configured to be connected to other external electronic devices.

Clause 24: A gas cooking appliance according to any of the preceding claims, comprising a remote control unit (130), in particular a smartphone or a tablet, the gas cooking appliance (200) being able to be controlled and monitored through the remote control unit (130).

Clause 25: A method for controlling the presence or absence of flame of a plurality of burners (Bi), implemented with a gas cooking appliance (200) comprising:
the plurality of gas burners (Bi) to which gas flow reaches,
an electrode (10) associated with each burner (Bi),
a flame sensor (20) associated with each burner (Bi), the flame sensor (20) being configured to provide a detection signal based on the presence or absence of the flame,
at least one electric switch (40) associated with an actuator, and configured to be activated when the actuator is actuated, and
a control unit (100) electrically connected to the electrodes (10), the flame sensors (20), and the switch (40), which is activated when the switch (40) is activated, the control unit (100) activating the electrodes (10) and the flame sensors (20) of the burners (Bi),
the method comprising:
a step of activating the control unit (100) (S1), activating at least the switch (40) when the respective actuator is actuated,
a step of activating the electrodes (10) and the flame sensors (20) (S2), associated with the burners (Bi), for igniting the flame and for monitoring the presence or absence of the flame in the burners (Bi),
a step of opening the passage of gas (S3), towards the burners (Bi), for igniting the flame in the burners (Bi),
a step of determining the presence or absence of flame (S4) ignited in the gas burners (Bi), based on the reception of the detection signals sent by the respective flame sensors (20), and
a step of turning off the gas cooking appliance (200) (S5), deactivating the control unit (100),
in step of activating the electrodes (10) and the flame sensors (20) (S2) the monitoring of the presence or absence of the flame in the burners (Bi) is carried out sequentially in time cycles T.

Clause 26: A method according to claim 25, wherein the step of activating the electrodes (10) and the flame sensors (20) (S2) comprises a sequence of activation of the flame sensor (20), of activation of the electrode (10), and sending of the detection signal, in each burner (Bi), from/to the control unit (100).

Clause 27: A method according to claim 25 or 26, wherein the gas cooking appliance (200) comprises a single switch (40) associated with a respective actuator (31), and a gas valve (30) for regulating the gas flow reaching each burner (Bi), the step of opening the passage of gas (S3) comprising a phase for opening the gas valve (30) (P31').

Clause 28: A method according to claim 27, wherein the step of determining the presence or absence of flame (S4) comprises a flame existence verification phase (P41), wherein the decision is made to carry out a waiting phase (P413) of the burner B1-B3 for a determined waiting time Te, if the control unit 100 receives a flame absence detection signal from the flame sensor 20.

Clause 29: A method according to claim 28, wherein the step of turning off the gas cooking appliance (200) (S5) comprises a turning off phase (P51) of the control unit (100) if, after receiving a flame absence detection signal from a flame sensor (20), the waiting time Te has elapsed.

Clause 30: A method according to claim 25 or 26, wherein the gas cooking appliance (200) comprises a switch (40) associated with each gas valve (30), the control unit (100) being activated when at least one of the switches (40) is activated, and a gas valve (30) associated with each burner (Bi) with an actuator (31) for regulating the gas flow when it is actuated, the respective switch (40) being associated with the actuator (31), the step of determining the presence or absence of flame (S4) comprising a flame existence verification phase (P41), wherein the decision is made to carry out a re-ignition phase (P411) of the burner (Bi) for a determined re-ignition time Tr, if the control unit (100) receives a flame absence detection signal from the flame sensor (20), or to carry out a deactivation phase of the respective electrode (10) (P412), if the control unit (100) receives a flame presence detection signal from the flame sensor (20).

Clause 31: A method according to claim 30, wherein the step of turning off the gas cooking appliance (200) (S5) comprises an activity verification phase (P52) of the gas cooking appliance (200), after the deactivation phase for deactivating the respective electrode (10) (P412), the activity verification phase (P52) comprising a verification phase of the activated switches (40) (P521).

Clause 32: A method according to claim 31, wherein the step of turning off the gas cooking appliance (200) (S5) comprises a turning off phase (P51) of the control unit (100), after the activity verification phase (P52), when all the activated switches (40) stop being activated, and after verifying in a residual heat verification phase (P5211) that a determined threshold is not exceeded in the gas cooking appliance (200).

Clause 33: A method according to claim 31 or 32, wherein the step of turning off the gas cooking appliance (200) (S5) comprises, after the verification phase of the activated switches (40), at least one switch (40) being activated, a verification phase of the active time Ti of the gas cooking appliance (200) (P5212) wherein if the time Ti has elapsed, a turning off phase (P51) of the control unit (100) is carried out, or, and if the time Ti has not elapsed, an activity continuation phase (P52121) is carried out, returning to the flame existence verification phase (P41).

Clause 34: A method according to any of claims 29 to 33, comprising a step of re-igniting the gas cooking appliance (200) (S6), after a turning off phase (P51), an activated switch (40) being deactivated and activated again or activating a switch (40) which was deactivated.

Clause 35: A method according to any of claims 29 to 32, wherein the gas cooking appliance (200) comprises a bistable gas valve (50) arranged in the gas conduit (32) fluidically communicating a gas supply (33) with the gas valves (30), the valve (50) being electrically connected to the control unit (100), and the control unit (100) being configured to open the valve (50) by sending an electric current pulse when a switch (40) is activated, the gas cooking appliance (200) being turned off, wherein the control unit (100) arranges the valve (50) in a stable open position in an opening phase (P31).

Clause 36: A method according to claim 35, wherein the step of turning off the gas cooking appliance (200) (S5) comprises a closing phase (P53) before the turning off phase (P51), the valve (50) passing to a stable closed position by means of the control unit (100).

What is claimed is:
1. A gas cooking appliance comprising:
a plurality of gas burners that are each configured to produce a flame;

an electrode associated with each burner that when activated is configured to ignite the flame;

a flame sensor associated with each burner that is configured to produce a flame detection signal, the flame detection signal being a flame presence detection signal or a flame absence detection signal that are respectively indicative of a presence and absence of the flame;

a gas flow regulating valve associated with each burner that is configured to regulate a gas flow to the burner, the gas flow regulating valve being located in a gas flow path between a gas supply conduit and the burner, the gas valve transitional between first and second positions, in the first position gas flow to the burner is prevented and in the second position gas flow is provided to the burner;

an actuator including a switch that transitions between open and closed positions; and a control unit electrically powered at a first voltage, and electrically connected to the electrodes, the flame sensors, and the switch, the control unit configured to be activated upon the switch assuming the closed position and to then activate the electrodes and the flame sensors, the control unit configured to receive the flame detection signal to determine the presence or absence of the flame, the control unit being configured to monitor the flame detection signals of each of the flame sensors one at a time during each of a repeating first time cycle, the control unit being configured to generate detection voltage signals at a second voltage greater than the first voltage, the control unit includes a multiplexer that is configured to sequentially send the detection voltage signals to the flame sensors and to sequentially receive in response the flame detection signals from the flame sensors to monitor the presence or absence of the flame, the control unit being configured to generate ignition voltage signals at a third voltage greater than the first voltage and to send the ignition voltage signals to the electrodes for the purpose of igniting the flame in the burners, the sending of the ignition voltage signal, the sending of the detection voltage signal, and the reception of the flame detection signal are carried out in a serial manner in second time cycles, the sum of the second time cycles being less than a single first time cycle.

2. The gas cooking appliance according to claim 1, wherein the control unit is electrically powered by at least one battery at the first voltage.

3. The gas cooking appliance according to claim 1, wherein the control unit includes a flame detection device electrically connected to each of the flame sensors and electrically powered at the first voltage, the flame detection device being configured to generate the detection voltage signals at the second voltage, the control unit further including a management unit that includes the multiplexer that is electrically communicated with the flame detection device.

4. The gas cooking appliance according to claim 3, wherein the control unit includes a spark generator electrically connected to the electrodes and to the management unit, the spark generator being electrically powered at the first voltage and configured to generate the ignition voltage signals at the third voltage.

5. The gas cooking appliance according to claim 1, wherein, when activated, the control unit is configured to be deactivated when after receiving a flame presence detection signal from at least one flame sensor the control unit receives a flame absence detection signal from all the flame sensors, the control unit being configured to deactivate a time period after receiving the flame absence detection signal.

6. The gas cooking appliance according to claim 1, wherein the gas flow regulating valves are manually operated valves.

7. A gas cooking appliance comprising:

a plurality of gas burners that are each configured to produce a flame;

an electrode associated with each burner that when activated is configured to ignite the flame;

a flame sensor associated with each burner that is configured to produce a flame detection signal, the flame detection signal being a flame presence detection signal or a flame absence detection signal that are respectively indicative of a presence and absence of the flame;

a gas flow regulating valve associated with each burner that is configured to regulate a gas flow to the burner, the gas flow regulating valve being located in a gas flow path between a gas supply conduit and the burner, the gas flow regulating valve having a first position in which gas flow to the burner is prevented and a second position in which gas flow is provided to the burner;

an actuator associated with each gas flow regulating valve, each actuator including a switch that transitions between open and closed positions, the switch being in the open position when the gas flow regulating valve is in the first position, the switch being in the closed position when the gas flow regulating valve is in the second position; and a control unit electrically powered at a first voltage, and electrically connected to the electrodes, the flame sensors, and the switches, the control unit configured to be activated upon one of the switches assuming the closed position and to then activate the electrodes and the flame sensors, the control unit configured to receive the flame detection signals to determine the presence or absence of the flame, the control unit being configured to monitor the flame detection signals of the flame sensors one at a time during each of a repeating first time cycle, the control unit being configured to generate detection voltage signals at a second voltage greater than the first voltage, the control unit includes a multiplexer that is configured to sequentially send the detection voltage signals to the flame sensors and to sequentially receive in response the flame detection signals from the flame sensors to monitor the presence or absence of the flame, the control unit being configured to generate ignition voltage signals at a third voltage greater than the first voltage and to send the ignition voltage signals to the electrodes for the purpose of igniting the flame in the burners, the sending of the ignition voltage signal, the sending of the detection voltage signal, and the reception of the flame detection signal are carried out in a serial manner in second time cycles, the sum of the second time cycles being less than a single first time cycle.

8. The gas cooking appliance according to claim 7, wherein the gas flow regulating valves are manually operated valves.

9. The gas cooking appliance according to claim 7, wherein in a first range of actuation of the actuator, gas flow to the burner is regulated through the gas flow regulating valve, the switch assuming the closed position within a second range of actuation of the actuator, the second range of actuation being less than or equal to the first range of actuation.

10. The gas cooking appliance according to claim 7, wherein the control unit is configured to activate only the electrodes associated with the switches that are in the closed position.

11. The gas cooking appliance according to claim 10, wherein the control unit is configured to deactivate the electrodes upon receiving from an associated flame sensor a flame presence detection signal.

12. The gas cooking appliance according to claim 11, wherein the control unit is configured to again activate the electrodes for a determined time period upon receiving from an associated flame sensor a flame absence detection signal.

13. The gas cooking appliance according to claim 10, wherein the control unit is configured to monitor only the flame detection signals of the flame sensors associated with the switches in the closed position.

14. The gas cooking appliance according to claim 7, wherein when the control unit is activated, the control unit is configured to be deactivated when all of the switches are in the open position.

15. The gas cooking appliance according to claim 7, wherein, when activated the control unit is configured to be deactivated when the flame presence detection signal of one of the flame sensors is received in the control unit for a first time period.

16. The gas cooking appliance according to claim 7, wherein when the control unit is activated the control unit is configured to be deactivated upon receiving a flame absence detection signal from a flame sensor after a predetermined period of time after a reignition of the flame is attempted.

17. The gas cooking appliance according to claim 7, wherein the control unit is electrically powered by at least one battery at the first voltage.

18. The gas cooking appliance according to claim 7, wherein the control unit includes a flame detection device electrically connected to each of the flame sensors and electrically powered at the first voltage, the flame detection device being configured to generate the detection voltage signals at the second voltage, the control unit further including a management unit that includes the multiplexer that is electrically communicated with the flame detection device.

19. The gas cooking appliance according to claim 18, wherein the control unit includes a spark generator electrically connected to the electrodes and to the management unit, the spark generator being electrically powered at the first voltage and configured to generate the ignition voltage signals at the third voltage.

* * * * *